May 20, 1947. H. F. RICHTER 2,420,683
ROD OR PIPE COUPLING
Filed April 27, 1944
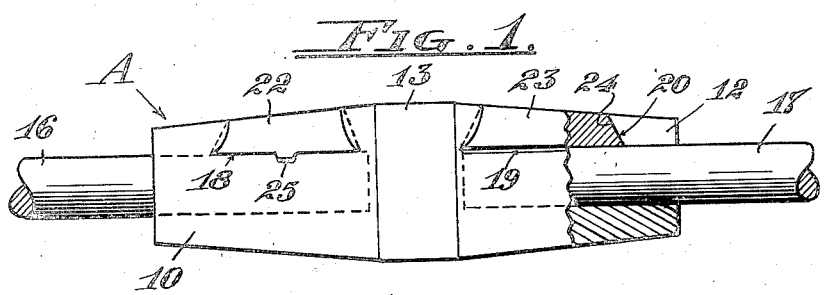
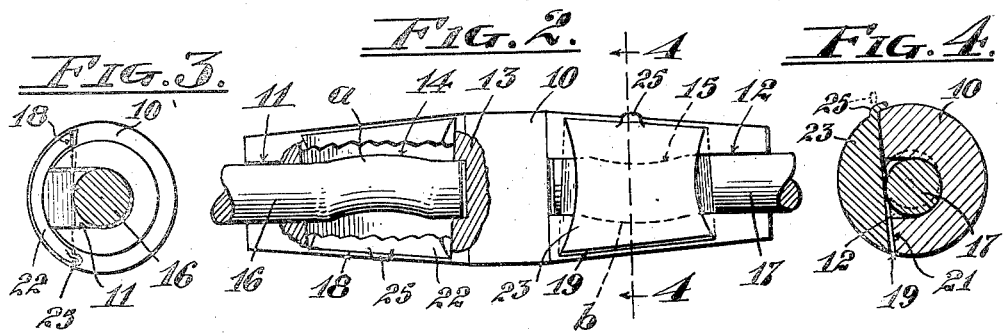
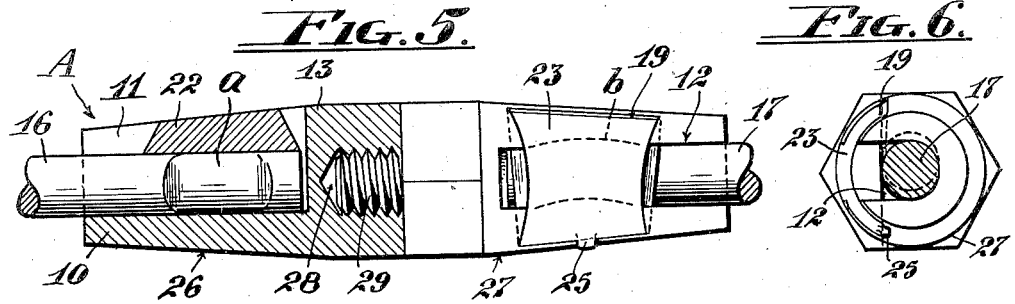
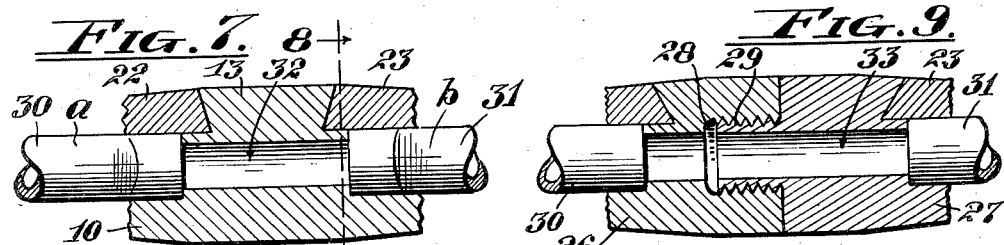
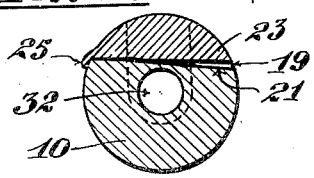
Inventor
Herman F. Richter;
By R. S. Berry
Attorney Patented May 20, 1947

2,420,683

UNITED STATES PATENT OFFICE 2,420,683

ROD OR PIPE COUPLING

Herman F. Richter, Los Angeles, Calif., assignor, by decree of distribution, to Aura Alice Richter Application April 27, 1944, Serial No. 533,043

6 Claims. (Cl. 287—119)

This invention relates to a coupling and particularly pertains to a coupling of the type set forth in United States Letters Patent No. 2,162,123 issued to me under date of June 13, 1939.

An object of the invention is to provide a coupling of the above character which is adapted to be utilized in connecting rods or pipes by forming the coupling with a longitudinally extended channel contoured to receive a curved contour formed on the end portion of a rod or pipe in lieu of screw threads as commonly employed in rod and pipe couplings; a particular object being to provide an improved means for detachably holding the contoured end of the rod or pipe in place in the coupling.

Another object is to provide a construction whereby securement of the rod or pipe in the coupling may be effected under wedge action whereby the rod or pipe may be securely clamped in its seated position within the channel in the coupling.

With the foregoing objects in view, together with such other objects and advantages as may subsequently appear, the invention is carried into effect as illustrated by way of example in the accompanying drawing, in which:

Fig. 1 is a view in elevation of the coupling with portions broken away showing it as applied in connecting the ends of aligned rods;

Fig. 2 is a plan view of the structure shown in Fig. 1 with parts broken away;

Fig. 3 is an end view of the structure shown in Fig. 2;

Fig. 4 is a view in cross section taken on the line 4—4 of Fig. 2;

Fig. 5 is a plan view partly in section showing the coupling as formed of separable end sections;

Fig. 6 is an end view of the structure shown in Fig. 5;

Fig. 7 is a detail in longitudinal section of a fragmentary central portion of the coupling of the form shown in Fig. 1 showing it as adapted for the connection of aligned pipes;

Fig. 8 is a detail in cross section taken on the line 8—8 of Fig. 7;

Fig. 9 is a view in longitudinal section of a fragmentary central portion of the type of coupling shown in Fig. 5 showing it as adapted to connect to the ends of aligned pipes.

Referring to the drawings more specifically, A indicates generally the coupling which embodies an elongated body member 10 formed on a side thereof with longitudinally extending channels 11 and 12 leading inwardly from the ends of the body member and terminating in spaced relation together at their inner ends in a wall 13 intermediate the ends of the body member.

The channels 11 and 12 are formed with longitudinally irregular contoured portions 14 and 15 to receive correspondingly contoured end portions a—b of rods 16 and 17 which are inserted side-ways in the channels 11 and 12 and disposed in nested position therein. The end portions of the channels are straight and in alignment with each other as are the portions of the rods 16 and 17 seated therein.

The side walls of the channels 11 and 12 extend outwardly beyond the outermost portion of the rods seated in the channels, which projecting portions of the channel side walls are formed with open-ended transverse grooves 18 and 19 having undercut side walls 20 forming the grooves of dove-tailed cross section. The bottom walls 21 of the grooves 18 and 19 extend on a plane slightly inward from the outermost portions of the rods seated in the channels. The grooves 18 and 19 are longitudinally tapered and are adapted to receive correspondingly tapered slide blocks 22 and 23 which are plano-convex in cross section and are insertable in the enlarged ends of the grooves 18 and 19 and have beveled side margins 24 conforming to the undercut margins 20 of the grooves. The slide blocks 22 and 23 are preferably wedge shape in longitudinal section as well as in plan so that when driven into the grooves 18 and 19 they will effect wedge engagement with the rods 16 and 17 to securely clamp the latter in place. By tapering the blocks 22 and 23 to conform to the longitudinal taper of the grooves 18 and 19 the extent of longitudinal movement of the blocks into the grooves is limited so that when the blocks are fully positioned in the grooves they will substantially align with the contiguous surface of the body member.

A bendable tongue 25 is formed on the reduced end of the block 23 which is adapted to be bent to overlie the body member as shown in Fig. 4 to hold the block in position.

In some instances the coupling A may be formed of separable end sections 26 and 27 as shown in Fig. 5; the section 26 being formed with an externally threaded nipple 29 for screw engagement with the recess 28, this detachable connection being formed in the wall portion 13 separating the ends of the channels 11 and 12.

The one-piece coupling may be adapted to be employed in connecting and communicating the end portions of aligned pipes 30 and 31, such as electrical conduits, in which event the body member of the coupling is formed with a bore 32 connecting the end channels 11 and 12 through the wall 13 as shown in Figs. 7 and 8. To adapt the coupling formed in separable sections 26 and 27 to connecting aligned pipes a bore 33 leads to the recess 28 and through nipple 29 from the inner ends of the channels 11 and 12 as shown in Fig. 9.

If need be the end portions of the pipe and any spaces that may be present therearound may be packed with a sealing compound to render the joint in the coupling water tight.

Manifestly the construction shown in Figs. 7, 8 and 9 may be employed in connecting rods as well as pipes although the passages 32 and 33 would serve no purpose, and likewise pipes may be connected by the coupling shown in Figs. 1 to 6 inclusive in which event the pipes would serve as rods since there would be no communication between the pipes through the coupling.

While I have shown and described specific embodiments of my invention I do not limit myself to the exact details of construction set forth and the invention embraces such changes, modifications and equivalents of the parts and their formation and arrangement as come within the purview of the appended claims.

I claim:

1. In a rod or pipe coupling, a body member substantially circular in cross section and formed with a longitudinally extending channel contoured on a side thereof for the reception and locking against longitudinal displacement of a correspondingly contoured curved end portion of a rod or pipe, the side walls of said channel having portions extending outwardly from the outer side of the rod or pipe in the channel, the said portions of the channel side walls being formed with opposed grooves having undercut side walls, and a slide block insertable in each of said grooves to overlie the curved end portion of the rod or pipe in said channel to hold it in place, said slide block being plano-convex in cross section.

2. In a coupling, a body member formed with a longitudinally irregular channel on a side thereof for the reception and locking against longitudinal displacement of a correspondingly contoured end portion of a rod or pipe, the side walls of said channel having portions extending outwardly from the outer side of a rod or pipe in the channel and formed with a transverse groove leading inwardly from a side of said body member, said groove having undercut side walls, and a wedge insertable in said groove engageable with the side walls thereof and adapted to overlie the contoured end portion of a rod or pipe in said channel in wedge engagement therewith to hold the rod or pipe in place, said wedge having a reduced end portion, said wedge having on its reduced end portion an integral tongue bendable to overlie the body member to hold the wedge in place.

3. In a rod or pipe coupling a body member formed with a longitudinally extending channel contoured on a side thereof for the reception and locking against longitudinal displacement of a correspondingly contoured end portion of a rod or pipe, the side walls of said channel having portions extending outwardly from the outer sides of the rod or pipe nested in the channel, said extended portions of the channel side walls being formed with opposed grooves having flat bottoms from side to side and of dove-tail cross section, and a slide block insertable in said grooves to overlie the contoured end portion of the rod or pipe in said channel to hold it in place, said slide block being plano-convex in cross section, said grooves being tapered longitudinally and the slide block conforming to their shape.

4. In a coupling, a pair of body members each having a longitudinally contoured channel in one face thereof for the nested reception and locking against longitudinal displacement of a correspondingly contoured end portion of a rod or pipe, means on each of said members for holding the curved end portions of the rod or pipe in nested engagement with said channel, one of said body members having a threaded recess on the outer end thereof, and an externally threaded nipple on the outer end of the other member for screw engagement with the recess on the companion member, said means including transverse grooves of undercut cross section overlying the inserted rods or pipes, and slide blocks of plano-convex cross section in said grooves to hold in place said rods or pipes.

5. The structure called for in claim 4 in which the body members are formed with bores leading from the ends of the channel therein through the recess and nipple on said members.

6. In a rod or pipe coupling, a body member formed with longitudinally extending channels contoured on a side thereof leading inwardly from each end thereof for the reception and locking against longitudinal displacement of a correspondingly contoured end portion of a pipe, said body member being formed with a bore connecting the inner ends of said channels, and having grooves on its end portions and slide blocks of plano-convex cross section fitted in said grooves on the end portions of said body member and adapted to overlie the contoured end portions of the pipe disposed in the contiguous channels to retain the pipes therein.

HERMAN F. RICHTER.

REFERENCES CITED

The following references are of record in the file of this patent:

UNITED STATES PATENTS

| Number | Name | Date |
|---|---|---|
| 421,059 | Somers | Feb. 11, 1890 |
| 1,582,757 | Jines | Apr. 27, 1926 |
| 1,062,486 | Lord | May 20, 1913 |
| 2,162,123 | Richter | June 13, 1939 |

FOREIGN PATENTS

| Number | Country | Date |
|---|---|---|
| 510,038 | France | Aug. 28, 1920 |